United States Patent
Ederer et al.

(10) Patent No.: US 10,179,365 B2
(45) Date of Patent: *Jan. 15, 2019

(54) METHOD AND DEVICE FOR PRODUCING THREE-DIMENSIONAL MODELS

(71) Applicant: Voxeljet AG, Friedberg (DE)

(72) Inventors: Ingo Ederer, Geltendorf (DE); Daniel Günther, München (DE); Andreas Dominik Hartmann, Stadtbergen (DE)

(73) Assignee: VOXELJET AG, Friedberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/890,592

(22) Filed: Feb. 7, 2018

(65) Prior Publication Data

US 2018/0169758 A1  Jun. 21, 2018

Related U.S. Application Data

(63) Continuation of application No. 13/640,126, filed as application No. PCT/DE2011/000378 on Apr. 10, 2011, now Pat. No. 9,914,169.

(30) Foreign Application Priority Data

Apr. 17, 2010   (DE) .......................... 10 2010 015 451

(51) Int. Cl.
  *B22F 3/105*   (2006.01)
  *B29C 64/165*  (2017.01)
  (Continued)

(52) U.S. Cl.
  CPC ............ *B22F 3/1055* (2013.01); *B22F 3/105* (2013.01); *B29C 64/153* (2017.08);
  (Continued)

(58) Field of Classification Search
  CPC ................... B22F 3/1055; B22F 3/105; B22F 2003/1056; B29C 64/153; B29C 64/165; Y02P 10/295; B33Y 10/00
  See application file for complete search history.

(56) References Cited

U.S. PATENT DOCUMENTS

| 3,935,339 A | 1/1976 | Cooke, Jr. |
| 4,247,508 A | 1/1981 | Housholder |

(Continued)

FOREIGN PATENT DOCUMENTS

| AL | 2006/100166 A1 | 9/2006 |
| AU | 720255 B2 | 5/2000 |

(Continued)

OTHER PUBLICATIONS

US 4,937,420, 06/1990, Deckard (withdrawn)

(Continued)

*Primary Examiner* — Robert J Grun
(74) *Attorney, Agent, or Firm* — The Dobrusin Law Firm, PC

(57) ABSTRACT

The present invention relates to a method for producing three-dimensional objects based on computer-provided data, whereby a material is deposited in layers in a process chamber and the material is selectively solidified and/or bonded using a bonding apparatus and/or a solidifying apparatus in the process chamber, these steps being repeated. A conveyance of the material proceeds during the build process and proceeds continuously, sequentially and evenly up to an unpacking position.

20 Claims, 10 Drawing Sheets

Figure 1:
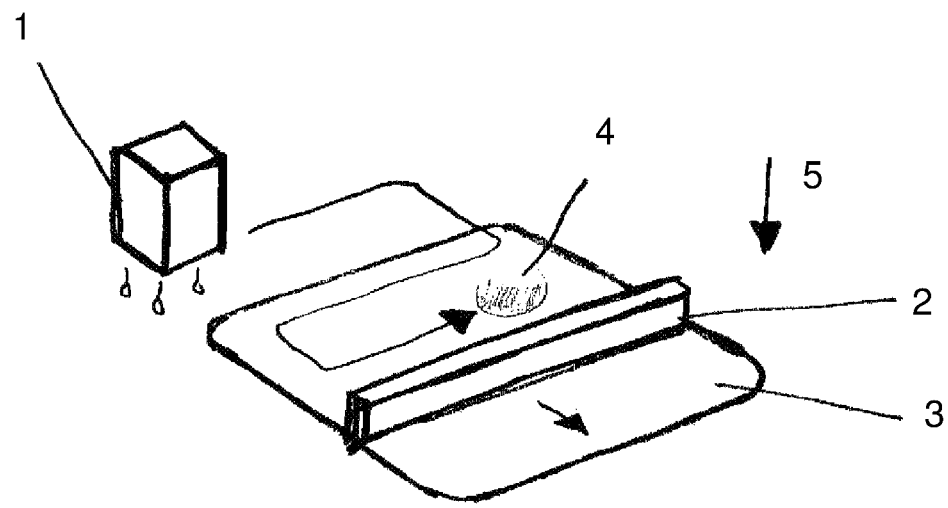

(51) Int. Cl.
*B29C 64/153* (2017.01)
*B33Y 10/00* (2015.01)

(52) U.S. Cl.
CPC .... *B29C 64/165* (2017.08); *B22F 2003/1056* (2013.01); *B33Y 10/00* (2014.12); *Y02P 10/295* (2015.11)

(56) References Cited

U.S. PATENT DOCUMENTS

| | | | |
|---|---|---|---|
| 4,369,025 A | 1/1983 | Von Der Weid |
| 4,575,330 A | 3/1986 | Hull |
| 4,591,402 A | 5/1986 | Evans et al. |
| 4,600,733 A | 7/1986 | Ohashi et al. |
| 4,665,492 A | 5/1987 | Masters |
| 4,669,634 A | 6/1987 | Leroux |
| 4,711,669 A | 12/1987 | Paul et al. |
| 4,752,352 A | 6/1988 | Feygin |
| 4,752,498 A | 6/1988 | Fudim |
| 4,863,538 A | 8/1989 | Deckard |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,089,186 A | 2/1992 | Moore |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,229,209 A | 7/1993 | Gharapetian et al. |
| 5,248,456 A | 8/1993 | Evans, Jr. et al. |
| 5,252,264 A | 10/1993 | Forderhase et al. |
| 5,263,130 A | 11/1993 | Pomerantz et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,324,617 A | 6/1994 | Majima et al. |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,418,112 A | 5/1995 | Mirle et al. |
| 5,427,722 A | 6/1995 | Fouts et al. |
| 5,431,967 A | 7/1995 | Manthiram et al. |
| 5,433,261 A | 7/1995 | Hinton |
| 5,482,659 A | 1/1996 | Sauerhoefer |
| 5,490,962 A | 2/1996 | Cima et al. |
| 5,503,785 A | 4/1996 | Crump et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,055 A | 11/1996 | Melling et al. |
| 5,573,721 A | 11/1996 | Gillette |
| 5,589,222 A | 12/1996 | Thometzek et al. |
| 5,597,589 A | 1/1997 | Deckard |
| 5,616,294 A | 4/1997 | Deckard |
| 5,616,631 A | 4/1997 | Kiuchi et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,747,105 A | 5/1998 | Haubert |
| 5,749,041 A | 5/1998 | Lakshminarayan et al. |
| 5,753,274 A | 5/1998 | Wilkening et al. |
| 5,807,437 A | 9/1998 | Sachs et al. |
| 5,837,373 A | 11/1998 | Siak et al. |
| 5,837,960 A | 11/1998 | Lewis et al. |
| 5,851,465 A | 12/1998 | Bredt |
| 5,884,688 A | 3/1999 | Hinton et al. |
| 5,897,825 A | 4/1999 | Fruth et al. |
| 5,902,441 A | 5/1999 | Bredt et al. |
| 5,902,537 A | 5/1999 | Almquist et al. |
| 5,904,889 A | 5/1999 | Serbin et al. |
| 5,934,343 A | 8/1999 | Gaylo et al. |
| 5,940,674 A | 8/1999 | Sachs et al. |
| 5,943,235 A | 8/1999 | Earl et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,116,517 A | 8/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,175,422 B1 | 1/2001 | Penn et al. |
| 6,193,922 B1 | 2/2001 | Ederer |
| 6,210,625 B1 | 4/2001 | Matsushita |
| 6,216,508 B1 | 4/2001 | Matsubara et al. |
| 6,217,816 B1 | 4/2001 | Tang |
| 6,259,962 B1 | 7/2001 | Gothait |
| 6,270,335 B2 | 8/2001 | Leyden et al. |
| 6,305,769 B1 | 10/2001 | Thayer et al. |
| 6,318,418 B1 | 11/2001 | Grossmann et al. |
| 6,316,060 B1 | 12/2001 | Elvidge et al. |
| 6,322,728 B1 | 12/2001 | Brodkin et al. |
| 6,335,052 B1 | 1/2002 | Suzuki et al. |
| 6,335,097 B1 | 1/2002 | Otsuka et al. |
| 6,350,495 B1 | 2/2002 | Schriener et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hoechsmann et al. |
| 6,436,334 B1 | 8/2002 | Hattori et al. |
| 6,460,979 B1 | 10/2002 | Heinzl et al. |
| 6,467,525 B2 | 10/2002 | Herreid et al. |
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |

(56) References Cited

U.S. PATENT DOCUMENTS

| | | | |
|---|---|---|---|
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,608,672 B2 | 10/2009 | Hachikian |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 9,914,169 B2 * | 3/2018 | Ederer ............... B22F 3/1055 |
| 2001/0045678 A1 | 11/2001 | Kubo et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Noel et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0280185 A1 | 12/2005 | Russell et al. |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0237933 A1 | 10/2008 | Hochmann et al. |
| 2008/0241404 A1 | 10/2008 | Allaman et al. |
| 2008/0260945 A1 | 10/2008 | Ederer et al. |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0207288 A1 | 8/2010 | Dini |
| 2010/0212584 A1 | 8/2010 | Ederer et al. |
| 2010/0243123 A1 | 9/2010 | Ederer |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0049739 A1 | 3/2011 | Uckelmann |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax |
| 2012/0094026 A1 | 4/2012 | Ederer et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |

(56) References Cited

U.S. PATENT DOCUMENTS

| | | |
|---|---|---|
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Ederer et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 29506204.5 U1 | 6/1995 |
| DE | 4440397 | 9/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 10 2006 040 305 A1 | 3/2007 |
| DE | 102006029298 A1 | 12/2007 |
| DE | 102006030350 A1 | 1/2008 |
| DE | 102007040755 A1 | 3/2009 |
| DE | 102007047326 A1 | 4/2009 |
| DE | 102011053205 A1 | 3/2013 |
| DE | 102015006363 A1 | 12/2015 |
| EP | 0361847 B1 | 4/1990 |
| EP | 0431924 A2 | 6/1991 |
| EP | 1415792 | 5/2004 |
| EP | 1442870 | 8/2004 |
| EP | 2289462 A1 | 3/2011 |
| FR | 2790418 | 9/2000 |
| GB | 2382798 | 6/2003 |
| JP | S62275734 A | 11/1987 |
| JP | 2003136605 A | 5/2003 |
| JP | 2004082206 A | 3/2004 |
| JP | 2009202451 A | 9/2009 |
| WO | 95/18715 A1 | 7/1995 |
| WO | 96/05038 A1 | 2/1996 |
| WO | 00/21736 A1 | 4/2000 |
| WO | 00/51809 A1 | 9/2000 |
| WO | 01/34371 A2 | 5/2001 |
| WO | 01/40866 A2 | 6/2001 |
| WO | 02/064353 A1 | 8/2002 |
| WO | 02/064354 A1 | 8/2002 |
| WO | 03/016030 A1 | 2/2003 |
| WO | 03/016067 A2 | 2/2003 |
| WO | 2004/010907 A1 | 2/2004 |
| WO | 2004/014637 A1 | 2/2004 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2015/081926 A1 | 6/2015 |
| WO | 2015/085983 A2 | 6/2015 |
| WO | 2015/090265 A1 | 6/2015 |
| WO | 2015/090567 A1 | 6/2015 |
| WO | 2015/096826 A1 | 7/2015 |
| WO | 2015/078430 A1 | 8/2015 |
| WO | 2015/149742 A1 | 10/2015 |
| WO | 2015/180703 A1 | 12/2015 |
| WO | 2016/019937 A1 | 2/2016 |
| WO | 2016/019942 A1 | 2/2016 |
| WO | 2016/058577 A1 | 4/2016 |
| WO | 2016/095888 A1 | 6/2016 |
| WO | 2016/101942 A1 | 6/2016 |
| WO | 2016/146095 A1 | 9/2016 |

OTHER PUBLICATIONS

EOS Operating Manual for Laser Sintering Machine with Brief Summary.
EOS Operating Manual for Laser Sintering Machine, Part 1 with Brief Summary, Feb. 22, 2005.
EOS Operating Manual for Laser Sintering Machine, Part 2 with Brief Summary, Feb. 22, 2005.
Voxeljet's VXconcept—Continuous 3D printing for sand casting, You-Tube, Nov. 16, 2011, XP002713379, retrieved from the Internet: URL: http://www.youtube.com/watch?v=hgIrNXZjIxU retrieved on Sep. 23, 2013.
Screen shots of URL: http://www.youtube.com/watch?v=hgIrNXZjIxU taken in approximately 5 second intervals on Nov. 12, 2015.
Armin Scharf, "Erster 3D-Endlosdrucker", zwomp.de, http://www.zwomp.de/2012/11/06/voxeljet-endlosdrucker/ dated Nov. 6, 2012.
Cima et al., "Computer-derived Microstructures by 3D Printing: Bio- and Structural Materials," SFF Symposium, Austin, TX, 1994.
Sachs et al., "Three-Dimensional Printing: Rapid Tooling and Prototypes Directly from a CAD Model", Massachusetts Institute of Technology, pp. 131-136.
Sachs et al., "Three-Dimensional Printing: Rapid Tooling and Prototypes Directly from a CAD Model", Massachusetts Institute of Technology, pp. 143 & 151, Jan. 1990.
Jacobs et al., 2005 SME Technical Paper, title "Are QuickCast Patterns Suitable for Limited Production?"
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gebhart, Rapid Prototyping, pp. 118-119, 1996.
Marcus et al., Solid Freeform Fabrication Proceedings, Nov. 1993.
Marcus, et al., Solid Freeform Fabrication Proceedings, Sep. 1995, p. 130-33.
International Search Report and Written Opinion, Application No. PCT/DE2011/000378, dated Apr. 10, 2011.

* cited by examiner

METHOD AND DEVICE FOR PRODUCING THREE-DIMENSIONAL MODELS

The invention relates to a method for manufacturing three-dimensional models as expressed in the generic concept of patent claims 1 and 14 as well as a device as expressed in the generic concept of patent claim 16.

A method for producing three-dimensional objects from computer data is known from the prior art, for example, from the European patent specification EP 0 431 924 B1. In the method described therein, a particulate material is deposited in a thin layer onto a platform, and a binder material is selectively printed on the particulate material, using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thereby produced from the printed and solidified areas of the particulate material.

After it is completed, this object produced from solidified particulate material is embedded in loose particulate material and is subsequently removed from the process chamber and freed from loose particulate material. This is done, for example, using an extractor. This leaves the desired objects, from which the remaining particulate material is removed, e.g. by brushing.

Other particulate material-supported rapid prototyping processes work in a similar manner, such as, for example, selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods".

All the mentioned embodiments have in common a detailed manufacturing process for the desired products. The first step always consists of generating a filled volume, which contains the components, in the aforementioned process chamber. An example could be a powder feedstock. Further individual sequentially ordered steps follow, such as the removal of particulate material in order to obtain the desired final components.

In various further publications, such as patents WO2004014637A1 or U.S. Pat. No. 7,291,002B2, at least the build process is considered and a continuous operation for this purpose is suggested. Included in such is that the build platform is continuously lowered and the layer application is implemented in a screwing movement over the build area. However, in addition to the high equipment costs, also with this method, only one step is completed after termination of the build process. The removal of the unbound particulate material proceeds again in a subsequent, separate process.

The object of the invention is to provide a method and a device with which it is possible to continuously carry out diverse work steps.

This object is achieved by a method according to patent claims 1 and 14 as well as a device according to patent claim 16.

According to one aspect of the present invention is a method for producing three-dimensional objects, using a three-dimensional printing method based on computer-provided data, whereby a material is deposited in layers in a process chamber and the material is selectively solidified and/or bonded using a bonding apparatus and/or a solidification apparatus in the process chamber, these steps being repeated.

In hereby doing so, a conveyance of the first material proceeds during the build process and proceeds continuously sequentially and uniformly up to an unpacking position. Whereby "continuous" according to the invention does not mean that the conveyance always takes place with the same speed. Depending on the design, the conveyance can also proceed in steps.

The first material can include any imaginable material that can be deposited layerwise. This could be e.g. a powder material, a film material or a fluid material, for example a melted extrusion and/or a dripped material as used with the known Fused Deposition Modeling (FDM) process.

If a particulate material is now provided as a first material, then, according to a preferred embodiment of the present invention, a method for producing three-dimensional objects could be provided that uses a three-dimensional printing method based on computer-provided data, whereby a material is deposited in layers with the aid of a spreader device in a process chamber onto a particulate material feedstock and the particulate material is selectively solidified using a solidification apparatus in the process chamber, these steps being repeated until a desired object is obtained and unpacked.

According to a preferred embodiment of the present invention, the build process includes the application of a first material layer and, if required, the solidification of certain areas, according to the computer data provided.

The conveyance of the first material continuously, sequentially and uniformly up to an unpacking position including during the build process enables the continuous and to some degree simultaneous implementation of multiple work steps. Such a device can also be operated infinitely.

Whereby conveyance, according to a preferred embodiment of the present invention, does not mean only the execution of a first material. It could also well be that the spreader unit and the solidification unit are moved over the layers of the first material and, consequently, an area of a process chamber or build-up space and with it also an unpacking position is constantly shifted and thereby the first material is conveyed according to kinematic reversal.

It is thus proposed to dispense with a lowerable build platform during operation of the method and instead of this to produce a continuous material layer stack or even a particulate material feedstock, for example. This material layer stack or particulate material feedstock with built objects, if applicable, can on one side have already exited a process space as well as the unpacking position, while on the other side the build process of objects is still being executed.

According to a preferred embodiment of the invention, in a method according to the invention, a conveyance direction essentially remains up to the unpacking position. According to the invention, this should be understood to mean that the conveyance may well exhibit slight direction changes, such as curves. However, no direction reversal is to take place. Since the conveyance process is continuous, the conveyance speed also remains essentially the same.

According to a preferred embodiment of the invention, it may prove advantageous if the spreader device, respectively the means for application for the first material, and a deposited material layer of the first material are such provided that the means for application and said material layer are moved toward each other relatively for said application of a further material layer that a reception plane of the material layer exhibits an angle of >0° to a layer plane of the means for application.

The use of particulate material could e.g. include such that the spreader device and the particulate material feedstock are such provided that said spreader device and feedstock are moved toward each other relatively for application of a further material layer that a reception plane of a particulate material reception means exhibits an angle of >0° to a layer plane of the spreader device.

Especially preferred is the selection of an angle less than or equal to an angle of repose of the particulate material.

Depending on the method and manner in which the material is moved forward, it may be helpful under circumstances if the solidification apparatus creates structures in the material, especially auxiliary structures, which hamper the sliding away of material in the process space. Such an embodiment can yet further stabilize the material layers.

When using particulate material, the method according to the invention can preferably be executed in such a way that first particulate material is introduced in a feedstock in a process chamber and then a build process of an object begins on this particulate material feedstock.

According to an especially preferred embodiment of the present invention, it may be provided that after removal from the process space, the objects created are e.g. unpacked from the particulate material without interrupting the build process.

According to an especially preferred embodiment of the method according to the invention, solid material is deposited in the form of thin films.

These films can, for example, be connected to each other by means of glueing and/or welding.

Besides that, it is also possible that the solidification apparatus creates structures that facilitate the automatic unpacking of the components.

By so doing, the method according to the invention can be executed continuously. That means that a build process of the object takes place in the layers of the material in a process space or process area and the material layers are always transported with the objects and the build process can be carried out infinitely. After conducting the objects out from the process space area, these can be e.g. unpacked and removed from any conveyance means if the material is moved according to a preferred embodiment via a conveyance means. In this regard, conveyance can proceed either continuously and/or discontinuously.

For example, it is conceivable that the conveyance runs ad infinitum.

It is also possible that the material moves horizontally or horizontally with an angle.

According to a further aspect, the invention also relates to a method for continuously producing three-dimensional objects using computer-provided data, whereby a material is deposited on a movable material reception means and on one side of the material an object or multiple objects are formed by repeated application of layers of the material and subsequent solidification and/or binding of the material and repetition of these steps, the object or objects on the material reception means are continuously moved out of a process area during the production process and unpacked on the material reception means during the production process.

It may prove advantageous if the layer plane exhibits an angle of >0° to a reception plane of the reception means.

According to a further aspect of the present invention, a device for producing three-dimensional objects using computer-provided data is described, whereby a material is deposited in layers using a spreader device and selectively solidified using a solidification apparatus and these steps are repeated.

If, for instance, particulate material is used as the layer material, then it may be provided that such a device deposits particulate material in layers with the aid of a spreader device on a particulate material feedstock and the particulate material is selectively solidified using a solidification apparatus and these steps are repeated.

To do so, means are provided to convey the material during the build process continuously and sequentially up to an unpacking position.

Moreover, it is conceivable that the material includes film material, extrusion material and/or a fluid.

Preferably, it may also be provided that the solidification apparatus can be a drop generator and/or a radiation source.

In this regard, a second material can be self-curing, for example, when coming in contact with the particulate material. Or the particulate material can be mixed with a substance that leads to the solidification of the material upon contact. It is also conceivable that the second material cures by means of UV radiation or supply of heat or in the presence of a gas.

According to a further preferred embodiment of the present invention, the spreader device and/or the solidification apparatus are moved on a coordinate system arranged at an angle perpendicular to the reception plane of the reception means.

If a particulate material is used, then preferably the angle selected for the coordinate system is smaller than the angle of repose of the particulate material.

In so doing, according to an especially preferred embodiment of the present invention, the angle of the feedstock favors freeing the objects after the build process by means of sliding off of particulate material.

According to a preferred embodiment of the present invention, the material is moved on a conveyor, whereby this may advantageously have one or multiple conveyor belts.

Furthermore it also possible that the conveyor has a chain conveyor.

In order to design the device somewhat smaller, it can also be provided that it is provided with limitations of the material layers.

In this regard and if needed, these material layers can be stabilized by means of limitation walls on both sides as well as above.

On the front sides, the layer material or the feedstock (if using particulate material) are respectively accessible. A spreader device that deposits new particulate material onto the feedstock is mounted on the one front side. To do so, the spreader device moves over the feedstock at the angle alpha to the horizontal, which is less than the angle of repose of the particulate material. It is thereby ensured that the layer of newly deposited particulate material remains at the desired site and does not slip off. The angle alpha can advantageously be adjusted on the device in order to harmonize this to the particulate material. In addition, on this side a device is mounted that selectively solidifies the particulate material alongside the particulate material plane defined by the spreader device. This solidification apparatus can be a print head, which releases small fluid droplets on the particulate material with the result that the particulate material solidifies there in a locally demarcated manner. Other devices can alternatively be employed, such as a radiation source for high energy beams.

After completion of a layer comprised of a coating and subsequent solidification, the feedstock is further transported a distance determined by the layer thickness. This can proceed with the aid of a conveyor belt on which the feedstock rests.

It would be possible to also design the bordering surfaces on the sides of the feedstock as synchronous conveyor belts. Examples of other conveyance options include the use of form-fitting conveyor chains, which only partially engage with the feedstock, e.g. via adapters, and move these forward layer thickness by layer thickness.

Subsequent to completion of the current layer and after the print head and spreader device have moved into a park position, it is also conceivable that an assembly line tray be used that comes in contact with the feedstock and pushes it forward layer thickness by layer thickness in the direction of the other free end.

In all its described embodiments, a device according to the invention is simpler to construct than the described state of technology. This is due to several points. On the one hand, the quantity of moving particulate material during continuous operation is nearly constant and does not increase as is the case with devices of the prior art. That simplifies guideways and drives since these can be designed for a constant operating point. On the other hand, the movement of the particulate material feedstock and the reception of the forces of its own weight that it exerts are separate from one another. The feedstock rests on an underlay and does not have to be moved in the gravitational direction at all or only to a small degree.

To prevent slipping down of the feedstock, a grid structure can be printed along with it. This stabilizes the particulate material feedstock and also helps to hinder the uncontrolled discharge of the particulate material in the break-out zone later on.

The length of the feedstock from the printing and/or coating unit right up to the exiting from the process space, respectively, the exiting from the process space and arrival in the unpacking area, for instance at a side opposite the process space, can be adapted to the respective solidification process. The length can be designed in a way that the feedstock remains a certain retention period in a contiguous situation to e.g. give the liquid time to react with the particulate material, thereby developing adequate stability. It is also possible that the solidification process requires heat or produces heat. Heat could be introduced by e.g. a preheated particulate material or e.g. radiation sources, which warm the coating plane in which the feedstock is to be introduced. In this case, the retention period can be used to allow the feedstock to cool down in a controlled fashion from the side opposite the solidification zone. There are also conceivable cases where both effects are jointly used. In both cases, a gradient results that conforms to the layer-building and passes through the feedstock.

In contrast to the discontinuous methods, in this case the layers reach the break-out zone in the same sequence as they were built. The retention period can thus be held nearly constant in the particulate material feedstock for all areas. This is a great advantage since in this way the curing can proceed in a much more controlled manner and is thereby accompanied by less delay than with devices according to the state of technology.

At the second free end, a break-out zone (unpacking position) is connected, in which unbound parts of the particulate material are removed. This can proceed manually or e.g. automatically with suctioning and/or blowing off. In so doing, the break-out zone should be dimensioned long enough in the layer-building direction that also larger objects can be completely removed and that interruptions in break-out activities even lasting longer periods of time do not necessarily have to lead to a termination of the layer building process simply because the feedstock reaches the end of the device.

Since the components can be laid stacked over one another in the direction of gravity, it may be required to embed the components with support structures that also have to be built and that are able to develop sufficient backing effect even in the absence of surrounding particulate material and to hold the components in position until they are removed.

Moreover, the break-out zone can be designed in such a manner that a great deal of the unbound particulate material can flow off freely. For example, this can take the form of a perforated underlay and/or may be achieved alone due to the absence of the lateral limitation walls.

The break-out zone can have auxiliary means such as nozzles pressurized with compressed air or other fluids, which are aimed at the particulate material feedstock and support the conveying away of unbound particulate material during operation. The discharge of particulate material in the break-out zone can also be supported by input of mechanical energy, such as vibrations, for example.

If the particulate material is reusable in the process, then it can be collected in the break-out zone and again fed into the application process after a possible pass through a preparation section. In the preparation section, it may also be necessary to perform a sifting of the particulate material and/or a regulated feed-in of fresh particulate material.

In this case, the device has the advantage over the state of technology in that the application zone and the break-out zone are both present and united in a single device and the material flows can thus be executed and controlled easily. Due to the continuous operation, only a relatively small quantity of particulate material needs to be buffered if the corresponding particulate material is reused. If reusability of particulate material is completely implemented, then only a particulate material quantity corresponding to that of the solidified quantity needs to be supplied to the process.

In the case of horizontal orientation of the conveyance plane, the solidification period, respectively, the break-out period only affects the length of the device.

However, the coordinate system of the layer building is not Cartesian, but rather distorted by the angle of repose.

In cases of a very small angle of repose of the particulate material, this can lead to highly distorted building spaces, respectively, process chambers, which in turn can lead to prolongation of the process duration required per component. It can therefore make sense to tilt the conveyance plane at a beta angle in relation to the horizontal and, by so doing, correctly reset the coordinate system. This has the additional advantage that the feedstock's own weight acts in the conveyance direction and thereby reduces the force required to move the feedstock.

In this case, the angle of repose in the break-out zone acts against the gradient conveyance plane. This means that the particulate material tends to flow out of the solidification zone. In the worst case, when the angle of repose is the same as the beta angle, the solidification zone will completely flow out if no countermeasures are taken, such as provision of printed compartments or a grid or honeycomb structure.

In both cases, it is necessary to set an auxiliary plate on the conveyance plane when starting the system, which enables the application of the first layers. This auxiliary plate takes over the alpha angle of repose and is pulled through the solidification zone by the conveyor until the end of the break-out space is reached and the auxiliary plate can be easily removed.

No special measures need to be observed, however, when shutting down the system. The free end of the feedstock is simply pulled through the solidification zone into the break-out area.

Such a system enables the processing of a multitude of different materials. Besides fluids, film material and extrusion material, possible materials also include sand, gypsum, metal particulate material or other inorganic particulate materials as well as plastic particulate material, flour and other organic particulate materials.

The system and the process permit a wide spectrum of varied applications, such as e.g. the manufacture of molds and models for metal casting as well as the production of components of the most diverse types. Likewise, an interesting advantage is that the continuous procedure also allows production of longer components without having to modify the device.

In general, its basic principle of essentially running horizontally in the "Z-axis" makes it suitable for all solid processing layer processes. That means that the principle can function anywhere where the deposited material has already developed sufficient stability shortly after application so that it does not slide away sideways due to its own weight.

According to the present invention, the material application types can vary.

Solid materials in the form of thin films made of paper, metal as well as plastic etc. can be applied in layers (LOM). For example, they can be applied to a layer body, which is essentially moved horizontally.

a. The application plane of the layer body can be positioned at an angle of less than 90° to the movement direction, but this is not obligatory. A Cartesian coordinate system would make sense in such a case, meaning that the application plane is situated perpendicular to the movement direction.

b. The films are applied onto the layer body and thereupon connected e.g. by glueing, welding or similar means. The contour of the component is cut out of the respective layer by means of e.g. a laser, cutter assembly or other cutting method. In doing such, the cutting can either take place before or after the application step. If it takes place after the application step, then the depth of the cut must be checked. To facilitate unpacking, auxiliary cutting aids can be employed to divide the surrounding film material into smaller units. The auxiliary cuts can, for example, be executed in the shape of rectangles. On complicated structures, the rectangles can be further reduced in size in order to better access the contour. Another option for simplification of unpacking is the selective application of adhesive between the films. For example, this can proceed via the photoelectric application of a hot melt adhesive (by means of a laser printer).

c. The films can either be dispensed from the roll or transported from a single-sheet supply in the application area. Unrolling from the roll is advantageous in this context since the automation expenditure can be kept minimal.

d. If the current film is applied and cut, then the infeed is activated and the layer body is further transported by one layer thickness. The layer body should have reached a certain length in order to stably store the components located there. If the layer body has reached this minimum length on the conveyor, then removal of the excess film can be begun on the end opposite the film application plane in order to break out the actual components. The removal can then proceed manually. The advantage of this build-up type lies in the quasi-infinite operation of the system.

e. In order to start up the system, an additional device in the form of an angle is needed upon which the first layers are applied. The angle is needed until the layer body being built up with layers acquires sufficient inherent strength that it can bear its own weight without deforming.

Hot-melt materials can also be applied to the layer bodies in extruded form (FDM). Likewise in this case, to start up the system an angle on the conveyor is needed as an auxiliary platform until the layer body achieves sufficient stability. For this purpose, an extruded "rope" of a meltable material is conveyed via any one of the position-adjustable heated nozzles in the application plane so that a controlled material flow of the now molten material is created at its outlet. The nozzle is computer-controlled over the existing layer body and selectively dispenses material onto the corresponding areas. The material flow must be coordinated with the nozzle movement in order to guarantee a uniform extrusion thickness. The underlying structure made out of extrusion material will melt again during application and will result in a solid connection together with the new material. The nozzle movement is controlled via e.g. a system of two crossed spindle axes in the layer application plane.

a. So that components of any complexity can be created, a second material is applied in the same manner via a second nozzle to the areas that are suitable for supporting the weight of the desired structure on the conveyance plane. The second material can e.g. possess a lower melting point than the first material or e.g. have different solubility characteristics in fluid media.

b. In order to avoid delay, the layer body can be built in a heated atmosphere. The temperature of the layer body, however, should lie below the solidification temperature of the second material.

c. The build-up of the layer body then proceeds in a manner compliant to the method described under 1). After a certain minimum length, the layer body can be conducted out of the heated atmosphere via a cool-down section and, for example, exposed to the dissolving fluid in a removal area, thus separating the components from the support structures.

d. It is likewise feasible to isolate the layer body after exiting from the cool-down section, e.g. via separation by means of a thermo saw, and then further process the resulting blocks. The blocks should then have the lengths of the intended components located therein.

Not least of all, a layer body can also be created in a similar manner via drip application of a second material (MM). To do so, print heads that can generate individual drops of two different materials are moved in one layer application plane over the layer body and dispense the build material and support material corresponding to the contour data issued by the computer. The support material must again ensure that at least the layer body's own weight can be supported on the conveyance unit.

a. Solidification of the build material can take place thermally via cooling of a molten mass or likewise via a polymerization reaction, e.g. by means of exposure to light of a photo-sensitive polymer.

b. The same applies to the support material.

c. In all three cases, the control of the thickness of the layer currently being processed represents the real challenge. In case 1), this cannot be adjusted since the thickness is determined by the film used. It is therefore advisable to measure the glued-on material thickness. The measurement can be used to calculate a correction of the forthcoming layer data and to compensate for previously resulting errors.

d. In cases 2) and 3), the application height can be checked by means of an additional leveling element, such as the surface of the nozzle in 2) or a heated roller or a scraper blade or a cutter.

A method according to the invention can be implemented more simply than a method on devices of the state of technology.

In contrast to devices according to the state of technology, the movement of the device for layer positioning must not proceed rapidly because positioning runs with long paths are no longer needed. A consequence of such is that a discontinuous switching device may also be used. This involves moving one layer thickness after a spreading process. One example could be a pneumatic actuator. The layer thickness is controlled by means of end stops. Levers or gears can be used to translate the movement. Especially preferred is an indexing clutch in combination with a lever that is actuated by means of a pneumatic cylinder.

For the purpose of more detailed explanation, the invention is described in further detail below on the basis of preferred embodiments with reference to the drawing.

IN THE DRAWING

Figure 2:
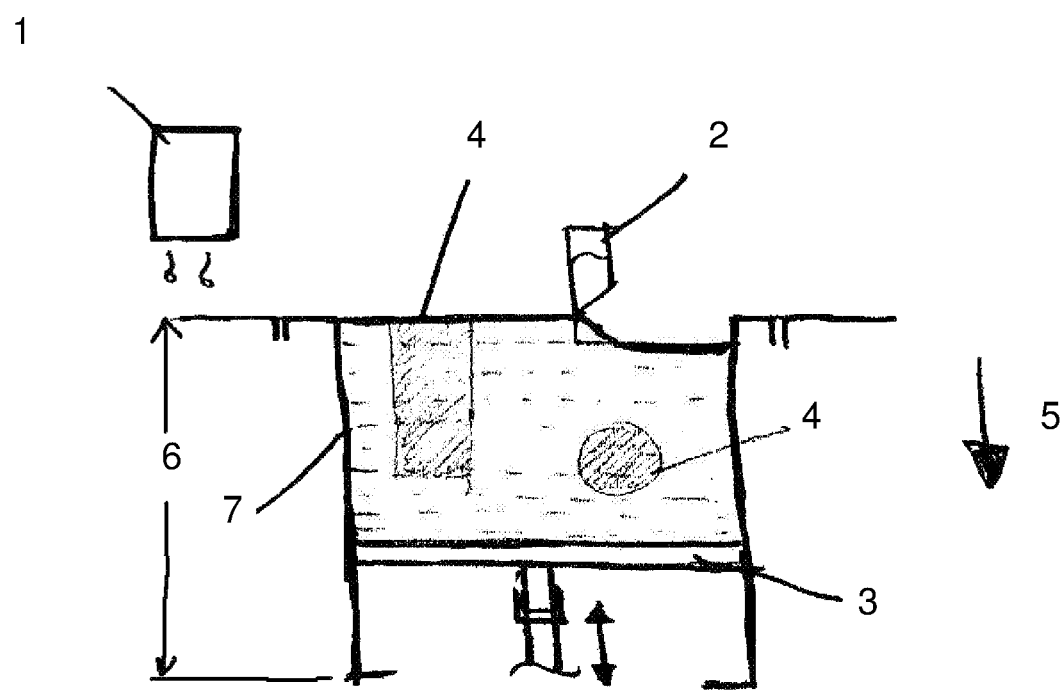
Figure 3:
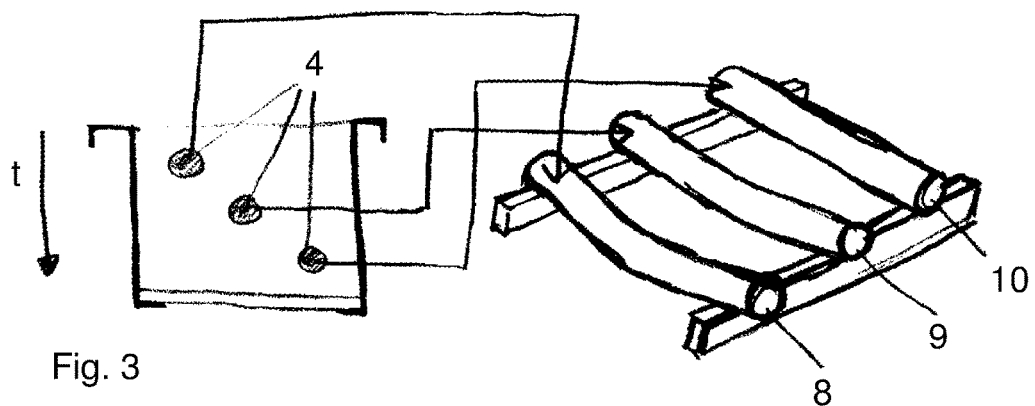
Figure 4:
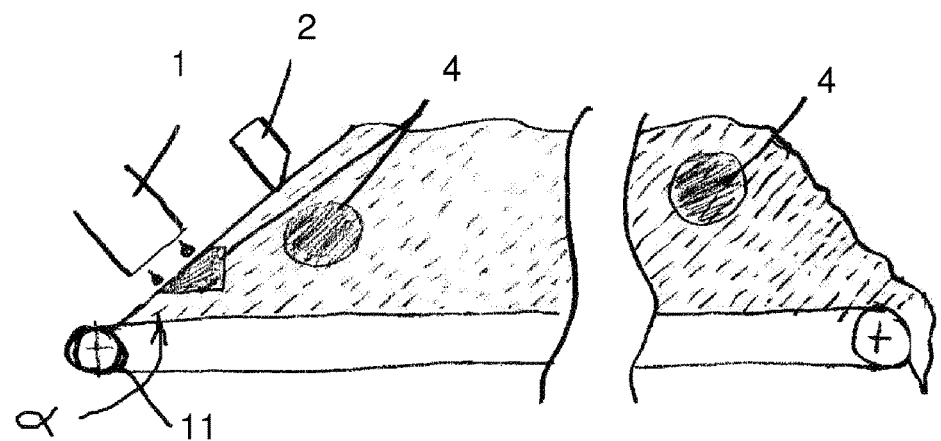
Figure 5:
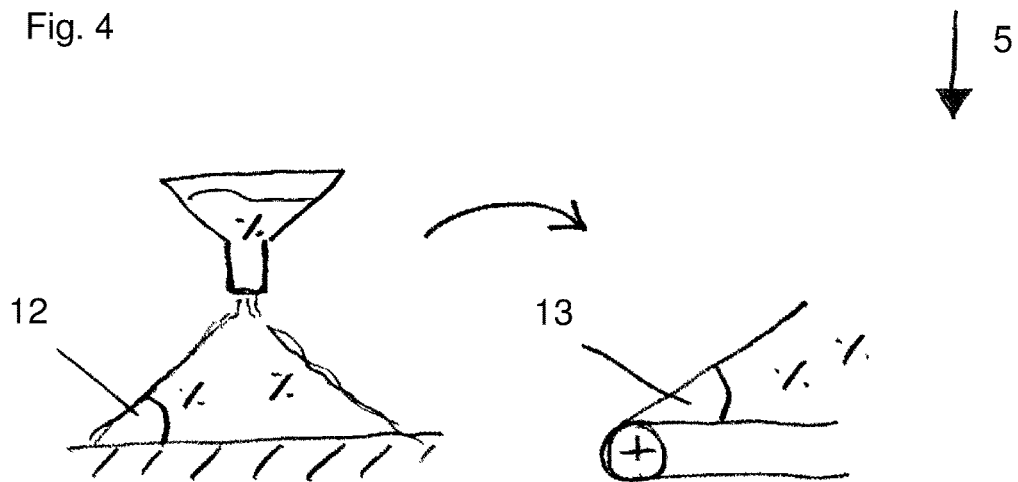
Figure 6:
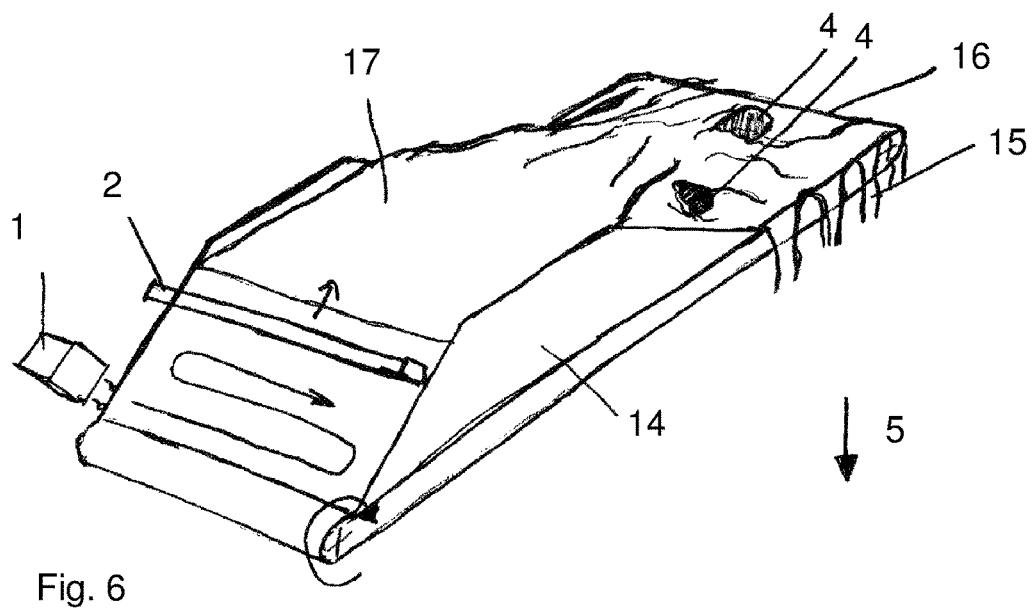
Figure 7:
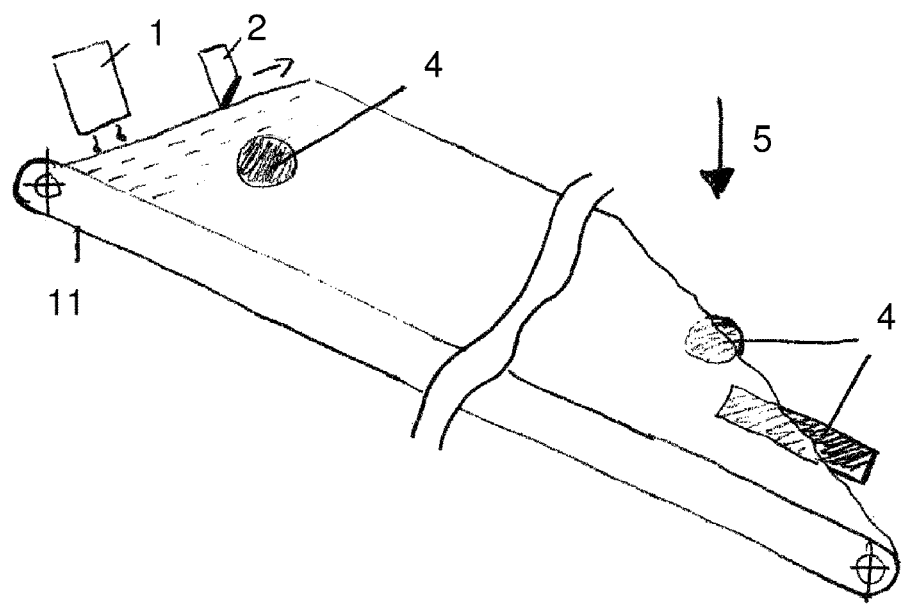
Figure 8:
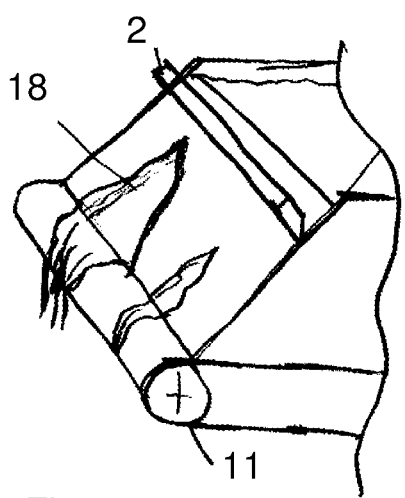
Figure 9:
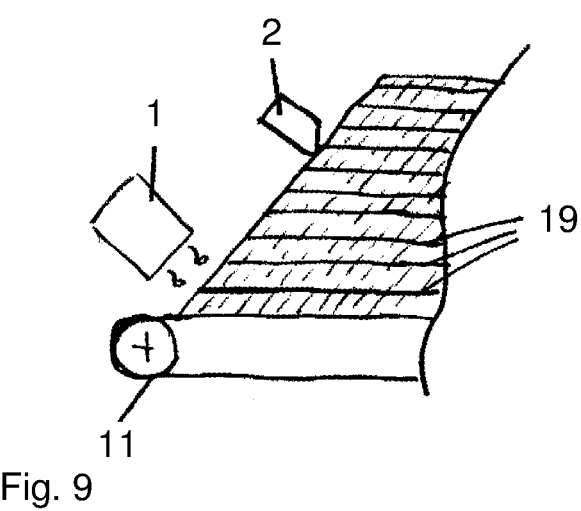
Figure 10:
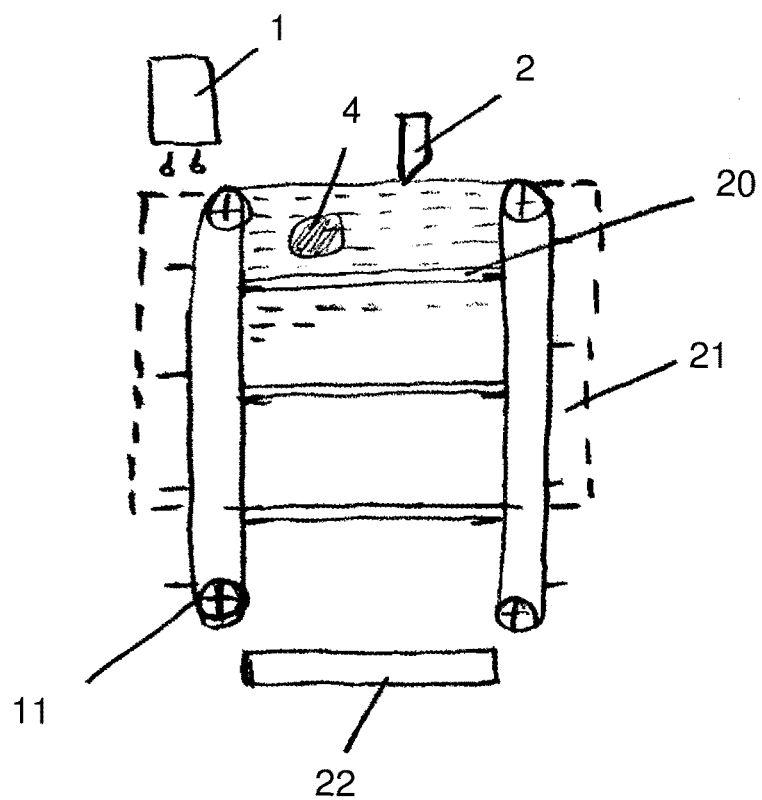
Figure 11:
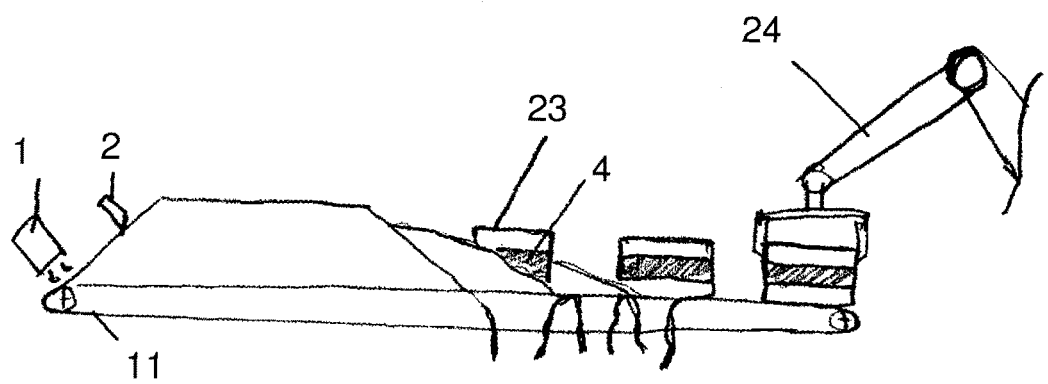
Figure 12:
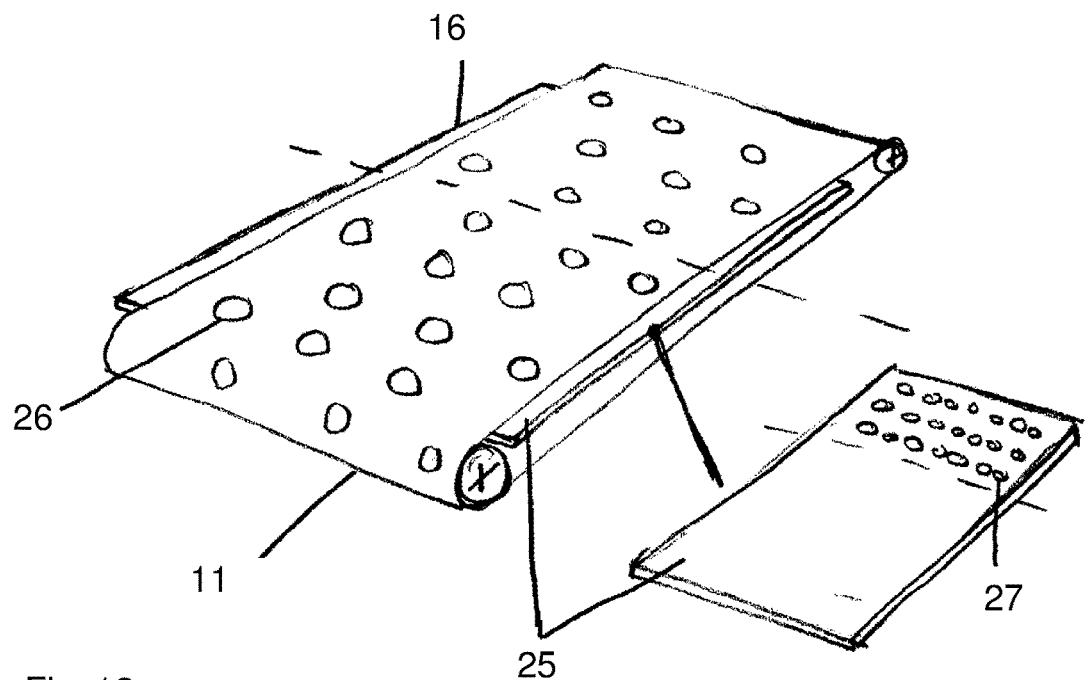
Figure 13:
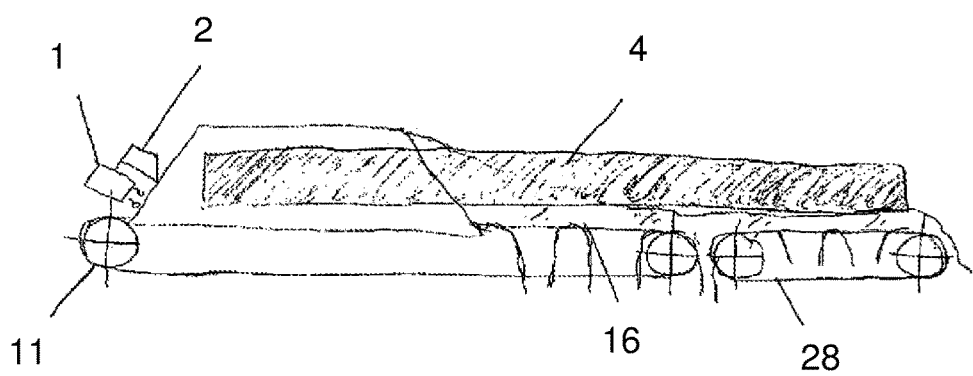
Figure 14:
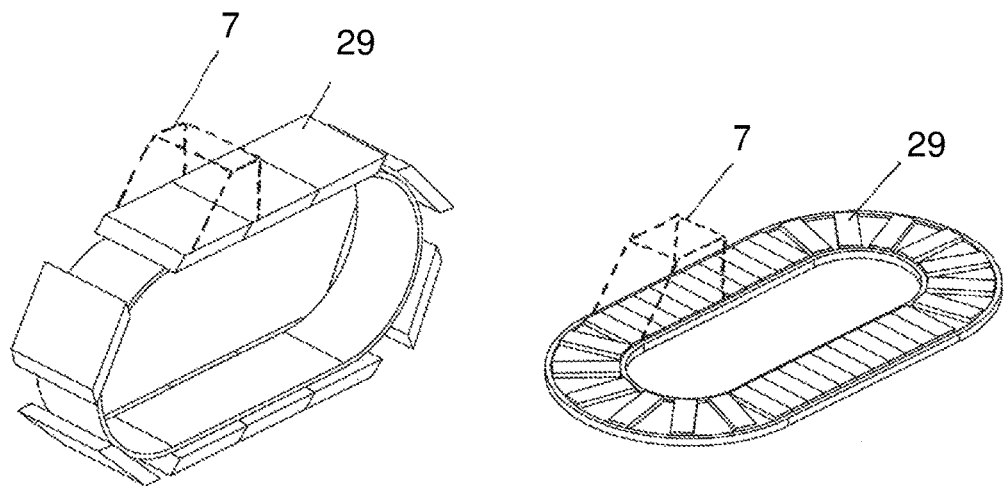
Figure 15:
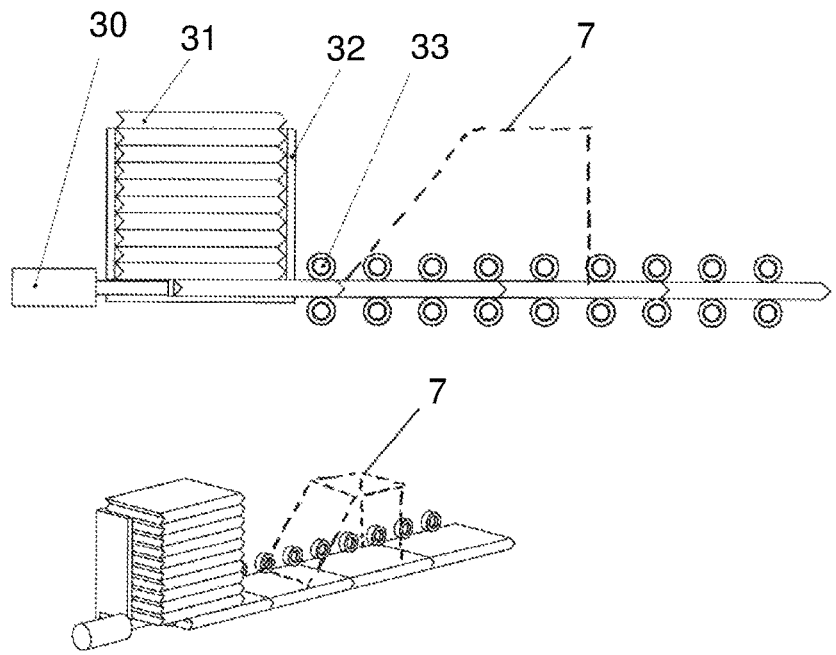
Figure 16:
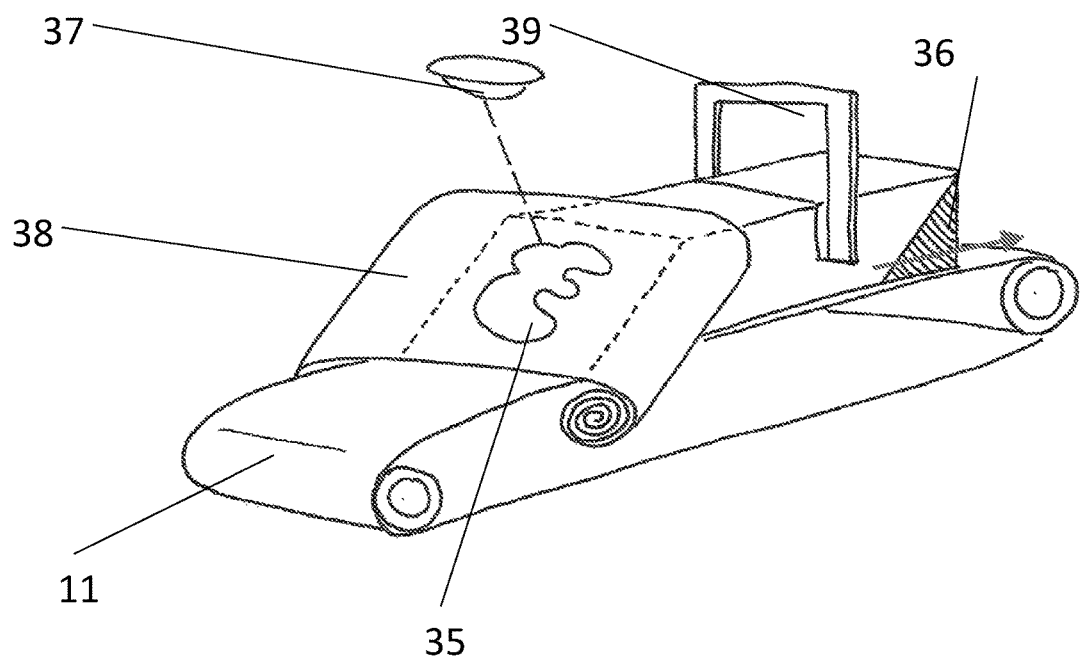
Figure 17:
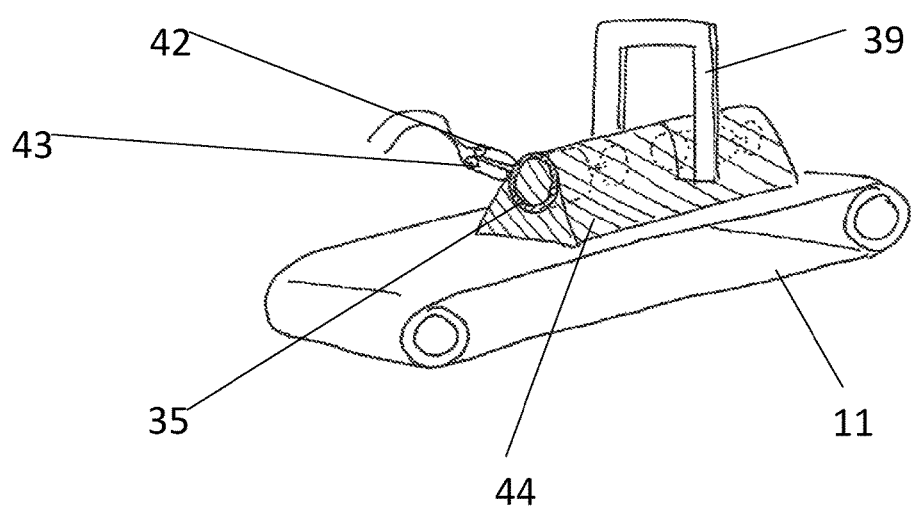
Figure 18:
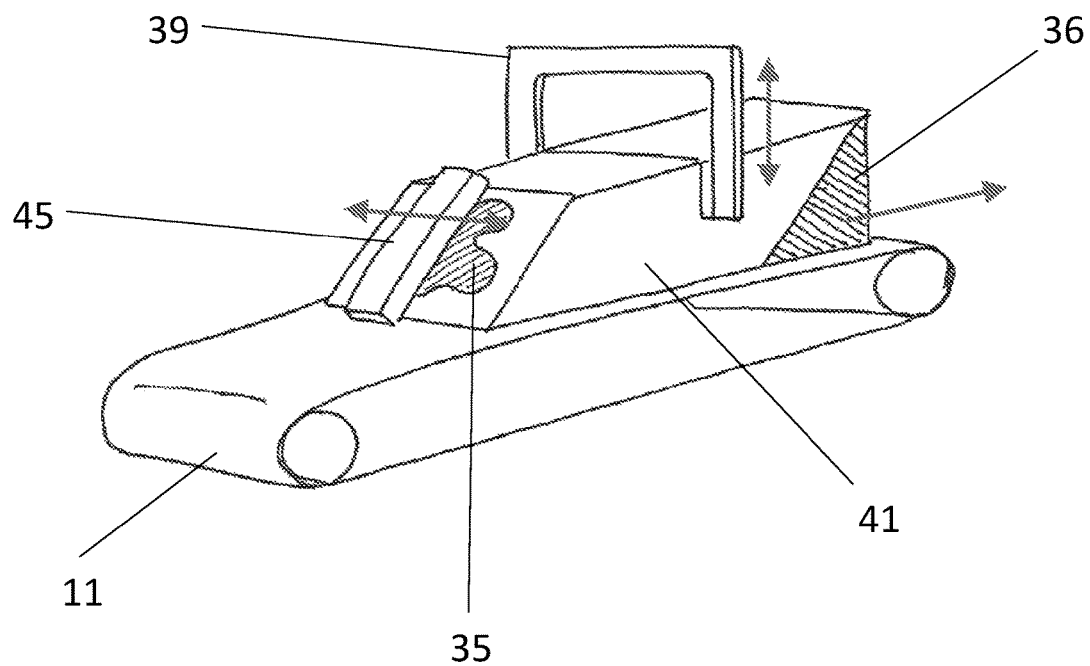
Figure 19:
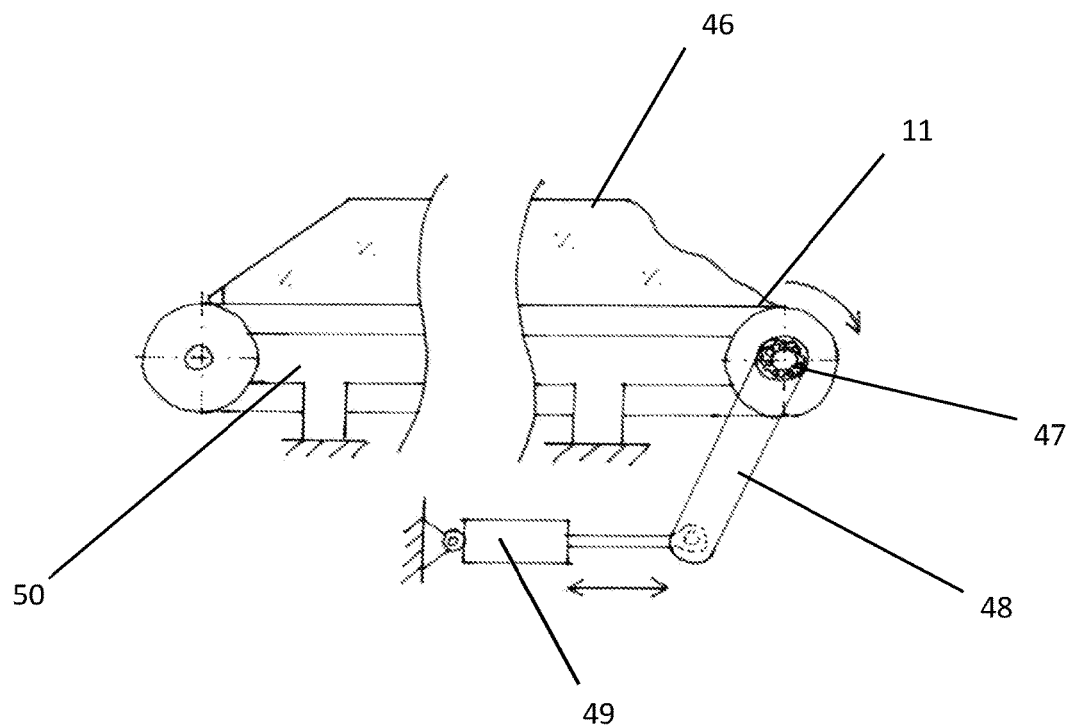

FIG. 1 An isometric view of a device according to the state of technology;

FIG. 2 A sectional view of a device according to the state of technology;

FIG. 3 A sectional view of a build chamber according to the state of technology and an illustration of various component stabilities;

FIG. 4 A sectional view of a preferred embodiment of the invention;

FIG. 5 An illustration on the angle of repose and the transference to a preferred embodiment of the invention;

FIG. 6 An isometric view of one preferred embodiment of the invention;

FIG. 7 A sectional view of a further preferred embodiment of the invention;

FIG. 8 An illustration of possible error sources of devices according to the invention;

FIG. 9 A sectional view of a preferred embodiment of the invention;

FIG. 10 A sectional view of a further preferred embodiment of the invention;

FIG. 11 A sectional view of a further preferred embodiment of the invention for the automatic unpacking of the components;

FIG. 12 An isometric view of a device according to the invention for the automatic removal of particulate material;

FIG. 13 A sectional view of a device according to the invention;

FIG. 14 A plate link belt as conveyance means for the usage according to a preferred embodiment of the invention;

FIG. 15 A magazine belt as conveyance means for the usage according to a preferred embodiment of the invention;

FIG. 16 A perspective view of a method according to a preferred embodiment, which uses film as material;

FIG. 17 A perspective view of a method according to a preferred embodiment, which uses melted plastic as material;

FIG. 18 A perspective view of a method according to a preferred embodiment, which uses a print head to apply build material;

FIG. 19 A drive for layer positioning; and

Figure 20:
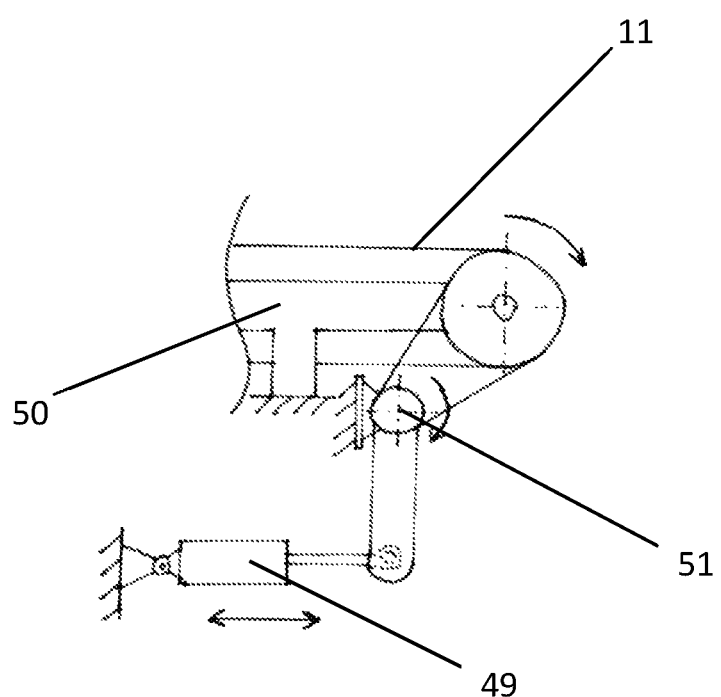

FIG. 20 A chain-connected extended drive in conjunction with FIG. 19.

FIG. 1 shows a device according to the state of technology. A spreader device (2) applies a layer consisting of particulate material on a build platform (3). At the conclusion, with the aid of computer-provided data, the particulate material is selectively solidified to a component (4) using the solidification apparatus (1), in this case a print head. The vertical direction or also the direction of gravity, which is depicted here perpendicular to the build platform (3), is designated with arrow (5). After solidification the build platform (3) is lowered by one layer thickness and then another layer is created.

In FIG. 2 the same device is depicted in sectional view. Several layers have already been created. A limiting factor during the method according to the state of technology is the build chamber depicted in the figure as (7), which is in this case also the process chamber. After a certain build height (6), the chamber (7) must be emptied or exchanged.

If the solidification is not immediately effected, but rather with a certain time delay, then special circumstances are to be taken into consideration with the method according to the state of technology.

As an example that can be derived from FIG. 3, during unpacking of component (4), the parts that were last created by the solidification apparatus (1) and the spreader device (2) are located above in the build chamber (7). These parts (8) are less solid than the parts (9) and (10) located further below in the build chamber (7). This necessitates a minimum waiting time that must be complied with before unpacking during such a process.

FIG. 4 depicts the first of the preferred embodiments of the invention. FIG. 4 shows a sectional view comparable with FIG. 2. The method sequence is subdivided into substeps, namely, commissioning of the device, continuous production of components (4) and shutdown of the device. These phases are described in the following:

Commissioning:

Creation of a basic feedstock—The spreader device (2) applies one layer comparable to that shown in FIG. 1. The layer plane of the particulate material, however, which, with the state of technology, corresponds to a plane that is parallel to the build platform (3), is inclined at an angle α in relation to a conveyor belt (11) here.

This coating process is repeated until sufficient filling is present to obtain the desired dimensions for component (4) being manufactured. In this manner a feedstock results, which is smooth on the spreader device side and fissured on the opposite-facing side in accordance with the particulate material properties.

Continuous build process:

If a basic feedstock is created, then a continuous build process can begin that only requires termination when the device is stopped for maintenance purposes. The process is designed to a great degree along the lines of the state of technology.

In a process chamber the spreader device (2) creates a layer that forms an angle α in relation to the perpendicular (5). At the conclusion, a predetermined quantity of particulate material is selectively solidified using the solidification apparatus (1). The process chamber is in this sense not a delineated room, but rather the space in which the object is built; the object is subsequently removed from this area, respectively process chamber.

The computer data processing must take this arrangement into consideration. The conveyor belt (11) is thereafter moved one layer thickness further so that the feedstock moves out from the spreader device plane and hereby gradually moves out of the process chamber. This process repeats itself until the device is shut down. Located in the feedstock are the components (4), which are ever further removed from the spreader device plane by the infeed movement.

After a certain distance on the conveyor belt (11), the components can be unpacked, while the build process continues uninterrupted in the process chamber. The length of this distance of the conveyor belt (11) hereby depends on the process employed. For instance, cooling is relevant when dealing with sintering processes. The curing time is relevant in cases of chemical solidification mechanisms.

In addition, the ejection of components (4) and the unbound particulate material from special areas may proceed in this area, such as, for example, protective gas atmospheres.

The unpacking itself can take place manually on the device or via discharge of the particulate material.

Shutting Down:

If the device is to be shut down for maintenance purposes, the entire feedstock can be brought on the conveyor belt (11) and out of the process chamber by moving the conveyor belt (11).

The angle (13) between the conveyor belt (11) and the spreader device plane is limited by the angle of repose of the particulate material (FIG. 5). Since an angle greater than the angle of repose (12) is accompanied by an increased risk of particulate material sliding off, the angle selected should be smaller than the angle of repose (12). In so doing, it can be guaranteed that a perfect surface is always available for the build process.

FIG. 6 shows an isometric view of an especially preferred embodiment of the invention. Here can be seen the walls (14) mounted for lateral delimitation of the feedstock. The feedstock runs through and is subjected to frictional forces. These walls enable the device, at the same usable cross-section, to be built smaller than if the particulate material were allowed to laterally flow freely. Outside of the process chamber, the walls (14) can be dispensed with so that a portion of the work required for unpacking the components, namely removal of unbound particle material, can be carried out by allowing the particulate material to freely run off (15) by simply leaving these walls (14) absent.

FIG. 7 shows another preferred embodiment of the invention. The illustration shows a sectional view. The conveyor belt (11) is inclined at a certain angle in relation to the perpendicular (5) here. Viewed horizontally, the plane on which the spreader device (2) and the solidification apparatus move now lies flatter than with the initially described device. On such an embodiment of the invention, particulate materials that exhibit a shallower angle of repose can also be economically processed. The steeper angle in the unpacking area does not disturb because a smooth surface area is not required here. The angle also favors the self-actuating unpacking of components (4).

If the angle of repose (12) is exceeded by the device according to the invention, then the smooth surfaces in the particulate material areas (18) created by the spreader device (2) break out so that no defined surfaces exist any longer for the solidification process. One method to address this problem is described in the following:

Another preferred embodiment of the invention is shown in FIG. 9. Protective structures or auxiliary structures (19) are created via the solidification apparatus (1). These artificially increase the angle of repose (12) of the particulate material. By so doing, "difficult" particulate materials can also be processed without modification of the device. The horizontal surfaces shown can be used for this purpose. However, there is no limit placed on usage of other structures, which could exhibit nearly any three-dimensional structure.

FIG. 10 shows the above-described devices with the same corresponding arrangement. In this case, the material extrudate is discharged parallel to the perpendicular. So that the feedstock created by the spreader device (2) does not slip away, plates, represented by floor plates (20), are built by the solidification apparatus (1). These engage with at least two conveyor belts. The remaining walls can be implemented rigidly for delimitation of the particulate material feedstock. Shown below the actual device is another transfer conveyor belt (22) that enables a continuous production process as described in claim 1. The feedstock is taken over here and the components (4) can be removed as the device continues to produce.

The described continuous production principle is also suitable for the construction of an entirely automated production system. This is represented in FIG. 11. In order to enable a robot (24) to grip the components (4), the option exists to attach auxiliary structures (23) with the solidification apparatus, thus facilitating grasping by the robot (24). The position of the components (4) in the feedstock is known from the production principle and can be used for the control of the robot (24).

FIG. 12 shows a preferred embodiment of a conveyor belt (11) to move the feedstock. The conveyor belt (11) itself contains openings (26). Beneath the conveyor belt (11) is a guidance plate (25). This bears the weight of the feedstock and guarantees the accuracy of feedstock movement. The guidance plate (25) has no openings in the area in which the feedstock is created and in the area in which components (4) are subsequently solidified. In the unpacking area, the openings (26) and (27) correspond depending on the position of the belt (11). A portion of the particulate material thus runs off by itself and exposes the components (4).

FIG. 13 shows that with a device according to the invention even components (4) that have very large sizes in one dimension can be produced. Such components must merely be supported if they are longer than the actual size of the device. To this end, additional simple conveyor belts (28) can be provided that take over the component or components (4) at the end of the device.

Further conveyance means are depicted in FIGS. 14 and 15, showing how according to the invention they could be used instead of a conveyor belt.

A plate-link belt is shown as a conveyance means in FIG. 14, while FIG. 15 shows a magazine belt. Plate-link belts have proven to be advantageous conveyance means since they can receive heavier loads than e.g. fabric-based belt conveyors and they additionally exhibit greater rigidity perpendicular to the conveyance direction. In FIG. 14, two various plate-link belts are depicted, which have linked plates (29). The build space (7) could be provided with such conveyance means for objects e.g. in the dashed line area.

The use of magazine belts (see FIG. 15) in a device according to the invention proves advantageous if, in addition to high rigidity, modularity is also required in the conveyor chain. With the aid of such magazine belts, e.g. printed objects can remain on the respective section of the conveyor line, for instance, on the build platform (31), until further use in a magazine (32) after completion of the build-up process and in this manner be separated temporarily from the remaining conveyor chain. The conveyor length can also be relatively freely adapted to the requirements and local conditions by simply either adding additional link plates (31) in the magazine (32) or removing them from there. This can take place e.g. using a cylinder (30), which pushes a link plate out of the magazine and then moves this forward over the conveyor rollers (33). One possible arrangement of a build space (7) is shown again as a dashed line drawing.

FIG. 16 shows a method according to a preferred embodiment of the invention. In this case, this is an endlessly continuous process for generative manufacturing methods, in which film layers (34) with cut-out contours are glued to a model (35).

The film layers can be thin rolls (38) made of paper, metal as well as of plastic. They are applied on a workpiece being run (36), which is moved essentially horizontally on a conveyor belt (11).

The application plane of the layer body proceeds with an angle less than 90° in relation to the movement direction.

The films (34) are applied onto the layer body and thereupon connected by means of e.g. glueing, welding or similar means. The contour of the component is cut out of the respective layer e.g. with a laser (37). The cutting can either take place before or after the application step. If it takes place after the application step, then the depth of the cut must be checked. To facilitate unpacking, the aid of a hot-wire saw (39) can be employed for auxiliary cuts, which divide the surrounding film material into smaller units. The auxiliary cuts can, for example, be executed in the shape of rectangles. On complicated structures, the rectangles can be further reduced in size in order to better access the contour.

If the current film layer (34) is applied and cut, then the infeed is actuated and the layer bodies are further transported by one layer thickness. The layer body should have reached a certain length in order to stably store the components or models (35) located there. If the layer body has reached this minimum length in the conveyor direction (11), then removal of the excess film can be begun on the end opposite the film application plane in order to break out the actual components. The removal can then proceed manually. The advantage of this build-up type lies in the quasi-infinite operation of the system.

In order to start up the system, an angle or workpiece (36) is needed upon which the first layers (34) are applied. The angle is needed until the layer body (35) being built up with layers acquires sufficient inherent strength and can bear its own weight without deforming.

FIG. 17 depicts a perspective view of a method according to a preferred embodiment, which uses melted plastic as material in nozzles (42).

According to the embodiment shown, another nozzle (43) is provided for the application of support material (44). The whole unit is thereby moved forward again on a conveyor belt (11). Since such a method forms an endless block, the finished part areas must be separated for removal, for example, by means of a hot wire saw (39).

The print heads (42, 43), which can generate individual drops of two different materials, are moved in a layer application plane over the layer body (35) and dispense the build material and support material (44) corresponding to the contour data issued by the computer. The support material (44) should hereby ensure that at least the layer body's (35) own weight can be supported on the conveyance unit (11).

An endlessly continuous method for a 3D printing process, during which the material is directly deposited with a print head (45), is depicted in FIG. 18.

A device used to accomplish this can be simplified for such a method.

In contrast to devices according to the state of technology, the movement of the device for layer positioning must not proceed rapidly because positioning runs with long paths are no longer needed. As mentioned above, a consequence of such is that a discontinuous switching device may also be used. Possible embodiments are depicted in FIG. 19 and FIG. 20.

A powder feedstock (46) is provided on a conveyor belt (11).

In order to move one layer thickness after a coating process, the entire conveyor belt is moved in such a manner using the drive roller that the application plane approaches the drive roller as per the desired layer thickness. The torque required for this and the angle of rotation can be applied using a lever (48) that is connected with a drive roller via an overrunning clutch (47). The lever can be e.g. actuated by means of a pneumatic cylinder (49). The layer thickness itself is then specified by the travelling distance of the cylinder. This can be delimited by end stops.

Other gear stages (51) may make sense depending on the required torque moments required. The layer thickness due to elasticity and slackness can be determined during commissioning and the desired target layer thickness can be set.

DESIGNATION LIST

1 Solidification unit
2 Spreader device
4 Building platform
5 Component
6 Vertical
7 Build height
8 Build chamber/Process chamber
9 Component (top from the build chamber)
10 Component (middle from the build chamber)
11 Component (lower from the build chamber)
12 Conveyor belt
13 Angle of repose
14 Angle of build plane relative to the conveyor belt
15 Solid delimitation wall
16 Run-off particulate material
17 End of device
18 Particulate material areas
19 Structures
20 Floor
21 Delimitation wall
22 Transfer conveyance means
23 Auxiliary structures
24 Robot
25 Guidance plate
26 Openings
27 Openings
28 Additional conveyor belt
29 Linked plates of the conveyor belt
30 Insertion unit
31 Rigid chain link
32 Magazine
33 Conveyor roller
34 Film layers 35 Model
36 Workpiece being run
37 Laser 1
38 Film rollers
39 Hot-wire saw
41 Job block
42 Nozzle for build material
43 Nozzle for support material
44 Support material
45 Print head
46 Powder feedstock
47 Overrunning clutch
48 Lever arm
49 Pneumatic cylinder
50 Frame
51 Chain-connected extended drive

The invention claimed is:

1. A system for producing objects from a build material including a first material, the system comprising:
   i) at least one device for depositing the first material in layers;
   ii) at least one solidifying apparatus for selectively solidifying the first material; and
   iii) at least one means to convey the build material throughout a build-up process;
   wherein the means to convey includes a continuous solid surface for supporting the deposited layers.

2. The system of claim 1, wherein the device for depositing the first material or the solidifying apparatus are moved on a coordinate system arranged at an angle to a reception plane of the continuous solid surface.

3. The system of claim 1, wherein the first material is deposited on a reception plane angled relative to a horizontal plane, with an acute angle, a, wherein the acute angle is less than an angle of repose of the first material.

4. The system of claim 3, wherein the device for depositing the first material is a spreader, the first material is a particulate material, and the spreader moves back and forth in a moving direction that is an x-direction or a y-direction of the reception plane, wherein the x-direction is parallel to the horizontal plane and the y-direction is angled relative to the horizontal plane.

5. The system of claim 4, wherein the spreader deposits the particulate material while moving backward in the moving direction and while moving forward in the moving direction.

6. The system of claim 5, wherein the system moves the means to convey a distance controlled by a measured height of the deposited layer.

7. The system of claim 6, wherein the reception plane is angled relative to the continuous solid surface.

8. The system of claim 7, wherein the means to convey moves in a horizontal direction, and the angle between the layer plane and the reception plane is less than the angle of repose of the particulate material.

9. The system of claim 3, wherein the solidifying apparatus moves back and forth in a moving direction that is an x-direction or a y-direction of the reception plane, wherein the x-direction is parallel to the horizontal plane and the y-direction is angled relative to the horizontal plane.

10. The system of claim 9, wherein the solidifying apparatus includes one or more printheads, a radiation source of a combination thereof.

11. The system of claim 10, where the system includes two different solidifying apparatus.

12. The system of claim 1, wherein the means to convey moves in a conveying direction that forms an acute angle, σ, to a horizontal plane.

13. The system of claim 12, wherein the first material is a particulate material having an angle of repose, wherein the acute angle, σ, is less than or equal to the angle of repose.

14. The system of claim 1, wherein the conveying direction is parallel to a horizontal plane.

15. The system of claim 1, wherein the means to convey includes one or more conveyor belts.

16. The system of claim 15, wherein the convey belt is a link conveyor belt.

17. The system of claim 15, wherein the means to convey includes openings near an unpacking end of the conveyor belt or the system includes a gap between two sequential conveyor belts for removing loose particulate material.

18. The systems of claim 15, wherein the system includes bordering surfaces on each side of the reception plane to stabilize the first material while the build material is conveyed.

19. The system of claim 18, wherein each of the bordering surfaces includes an upright conveyor belt that is angled relative to the conveyor belt that conveys the build material, wherein the upright conveyor belts preferably moves synchronously with the conveyor belt moving the build material.

20. The system of claim 15, wherein the conveyor belt has a surface on the edge to the deposited material which is parallel to the reception plane of the deposited material.

* * * * *

UNITED STATES PATENT AND TRADEMARK OFFICE
CERTIFICATE OF CORRECTION

PATENT NO. : 10,179,365 B2
APPLICATION NO. : 15/890592
DATED : January 15, 2019
INVENTOR(S) : Ingo Ederer et al.

Page 1 of 1

It is certified that error appears in the above-identified patent and that said Letters Patent is hereby corrected as shown below:

On the Title Page

"References Cited"
FOREIGN PATENT DOCUMENTS:
Delete "AL 2006/100166 A1 9/2006"
Insert --WO 2006/100166 A1 9/2006--

Signed and Sealed this
Twelfth Day of March, 2019

Andrei Iancu
*Director of the United States Patent and Trademark Office*